US012525715B2

(12) United States Patent
Chang et al.

(10) Patent No.: US 12,525,715 B2
(45) Date of Patent: Jan. 13, 2026

(54) ANTENNA UNIT, ANTENNA ARRAY, AND OPERATING METHOD OF ANTENNA ARRAY

(71) Applicant: TMY Technology Inc., Taipei (TW)

(72) Inventors: Su-Wei Chang, Taipei (TW); Hsuan-Hung Kuo, Taipei (TW)

(73) Assignee: TMY Technology Inc., Taipei (TW)

(*) Notice: Subject to any disclaimer, the term of this patent is extended or adjusted under 35 U.S.C. 154(b) by 59 days.

(21) Appl. No.: 18/655,332

(22) Filed: May 6, 2024

(65) Prior Publication Data

US 2025/0070461 A1 Feb. 27, 2025

(30) Foreign Application Priority Data

Aug. 24, 2023 (TW) ................................ 112131849

(51) Int. Cl.
*H01Q 3/36* (2006.01)
*H01Q 21/00* (2006.01)
(Continued)

(52) U.S. Cl.
CPC ........... *H01Q 3/36* (2013.01); *H01Q 21/0006* (2013.01); *H01Q 21/061* (2013.01); *H01Q 1/38* (2013.01)

(58) Field of Classification Search
CPC .. H01Q 1/38; H01Q 3/36; H01Q 3/44; H01Q 3/46; H01Q 21/00; H01Q 21/0006; H01Q 21/061; H01Q 21/065
See application file for complete search history.

(56) References Cited

U.S. PATENT DOCUMENTS 10,862,219 B2 12/2020 Haziza et al.
10,921,654 B2 2/2021 Vilenskiy et al.
(Continued)

FOREIGN PATENT DOCUMENTS

CN 110649356 1/2020
CN 107528121 2/2020
(Continued)

OTHER PUBLICATIONS

"Office Action of Taiwan Counterpart Application", issued on Aug. 13, 2024, p. 1-p. 6.
(Continued)

*Primary Examiner* — Hoang V Nguyen
(74) *Attorney, Agent, or Firm* — JCIPRNET

(57) ABSTRACT

An antenna unit includes a first substrate, a second substrate, a plurality of sidewalls, a liquid crystal layer, a first electrode, a second electrode, and a plurality of sidewall electrodes. The second substrate is opposite to the first substrate. The plurality of sidewalls are supported between the first substrate and the second substrate. The liquid crystal layer is located between the first substrate, the second substrate, and the plurality of sidewalls. The first electrode is disposed on the first substrate. The second electrode is disposed on the second substrate and electrically insulated from the first electrode. The plurality of sidewall electrodes are electrically insulated from each other and are respectively disposed on the plurality of sidewalls. The plurality of sidewall electrodes are electrically insulated from the first electrode and the second electrode. An antenna array and an operating method thereof are also provided.

16 Claims, 9 Drawing Sheets

1

(51) Int. Cl.
*H01Q 21/06* (2006.01)
*H01Q 1/38* (2006.01)

(56) References Cited

U.S. PATENT DOCUMENTS

| | | | |
|---|---|---|---|
| 11,316,238 | B2 | 4/2022 | Huh et al. |
| 2020/0153113 | A1 | 5/2020 | Rogers et al. |
| 2021/0328355 | A1 | 10/2021 | Xi et al. |
| 2022/0384961 | A1 | 12/2022 | Chang et al. |

FOREIGN PATENT DOCUMENTS

| | | | | |
|---|---|---|---|---|
| CN | 111201667 | | 5/2020 | |
| CN | 114185203 | | 3/2022 | |
| CN | 116259974 | | 6/2023 | |
| CN | 116259974 | A * | 6/2023 | ............... H01Q 3/36 |
| EP | 4145636 | | 3/2023 | |
| TW | 202230881 | | 8/2022 | |
| TW | 202316742 | | 4/2023 | |
| WO | 2008146123 | | 12/2008 | |
| WO | 2023115475 | | 6/2023 | |

OTHER PUBLICATIONS

"Office Action of Japan Counterpart Application", issued on Jun. 6, 2025, p. 1-p. 9.
"Office Action of Taiwan Counterpart Application", issued on Apr. 28, 2025, p. 1-p. 11.

* cited by examiner

ANTENNA UNIT, ANTENNA ARRAY, AND OPERATING METHOD OF ANTENNA ARRAY

CROSS-REFERENCE TO RELATED APPLICATION

This application claims the priority benefit of Taiwan application serial no. 112131849, filed on Aug. 24, 2023. The entirety of the above-mentioned patent application is hereby incorporated by reference herein and made a part of this specification.

BACKGROUND

Technical Field

The disclosure relates to an antenna unit, an antenna array, and an operating method of the antenna array.

Description of Related Art

As an anisotropic material, liquid crystal molecules have different dielectric constants along their long and short axes. When liquid crystals are used as dielectric-tunable materials in radio frequency (RF) applications or antenna applications, if the polarization direction of the signal is not parallel or perpendicular to the alignment of the liquid crystal layer, it can cause a problem of dual-permittivity, which can result in the transmission direction or radiation intensity of the signal to fall short of expectation.

SUMMARY

The disclosure provides an antenna unit, an antenna array, and an operating method of the antenna array, which can adjust an alignment of a liquid crystal layer.

In an embodiment of the disclosure, an antenna unit includes a first substrate, a second substrate, a plurality of sidewalls, a liquid crystal layer, a first electrode, a second electrode, and a plurality of sidewall electrodes. The second substrate is opposite to the first substrate. The plurality of sidewalls are supported between the first substrate and the second substrate. The liquid crystal layer is located between the first substrate, the second substrate, and the plurality of sidewalls. The first electrode is disposed on the first substrate. The second electrode is disposed on the second substrate and electrically insulated from the first electrode. The plurality of sidewall electrodes are electrically insulated from each other and are respectively disposed on the plurality of sidewalls. The plurality of sidewall electrodes are electrically insulated from the first electrode and the second electrode.

In an embodiment of the disclosure, an antenna array includes a plurality of first antenna units and at least one second antenna unit. Each of the plurality of first antenna units includes a first substrate, a second substrate, a plurality of sidewalls, a liquid crystal layer, a first electrode, a second electrode, and a plurality of sidewall electrodes. The second substrate is opposite to the first substrate. The plurality of sidewalls are supported between the first substrate and the second substrate. The liquid crystal layer is located between the first substrate, the second substrate, and the plurality of sidewalls. The first electrode is disposed on the first substrate. The second electrode is disposed on the second substrate and electrically insulated from the first electrode. The plurality of sidewall electrodes are electrically insulated from each other and are respectively arranged on the plurality of sidewalls. The plurality of sidewall electrodes are electrically insulated from the first electrode and the second electrode. The at least one second antenna unit is disposed adjacent to the plurality of first antenna units. The at least one second antenna unit includes a third electrode and a fourth electrode, and the third electrode and the fourth electrode are disposed on at least one of the first substrate and the second substrate.

In an embodiment of the disclosure, an operating method of an antenna array includes: providing an antenna array, in which the antenna array includes a plurality of first antenna units; applying a horizontal electric field to a liquid crystal layer by a plurality of sidewall electrodes; and applying a vertical electric field to the liquid crystal layer by a first electrode and a second electrode.

In order to make the above-mentioned features and advantages of the disclosure clearer and easier to understand, the following embodiments are given and described in details with accompanying drawings as follows.

DESCRIPTION OF THE EMBODIMENTS

Figure 1:
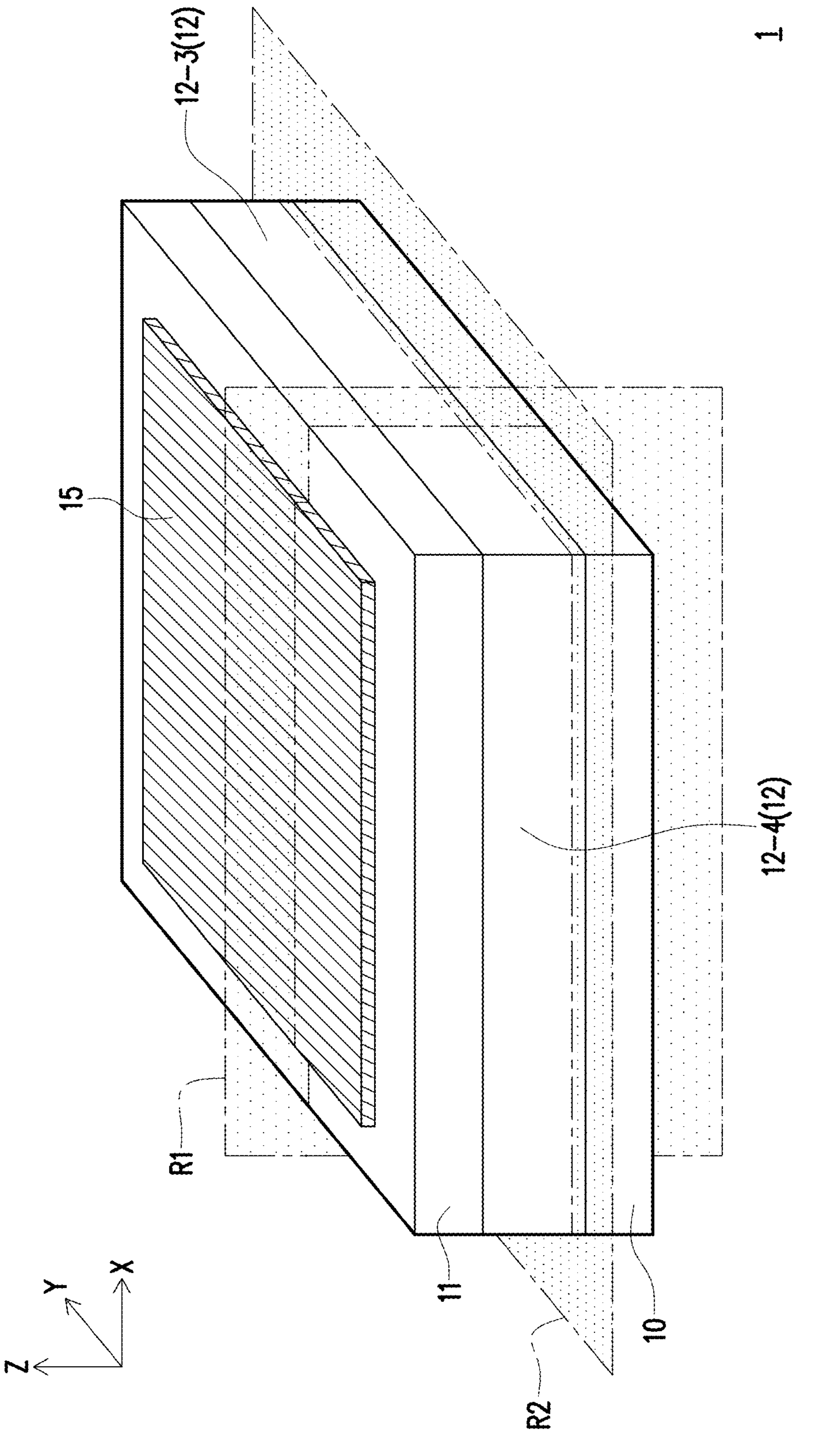
FIG. 1 is a schematic view of an antenna unit according to an embodiment of the disclosure.

Directional terms, such as “up”, “down”, “front”, “back”, “left”, “right”, mentioned in the disclosure are only directions with reference to the accompanying drawings. Accordingly, the used directional terms are used to illustrate, but not to limit, the disclosure.

In the drawings, each figure illustrates the general features of methods, structures, or materials used in a particular embodiment. However, these drawings should not be interpreted as defining or limiting the scope or nature encompassed by the embodiments. For example, the relative sizes, thicknesses, and positions of layers, regions, or structures can be reduced or exaggerated for clarity.

In the following embodiments, the same or similar elements use the same or similar referential numbers, and redundant description thereof is omitted. In addition, as long as the features of the different embodiments do not violate the spirit of the disclosure or conflict with one another, they can be mixed and matched arbitrarily, and simple equivalent changes and modifications made in accordance with the specification or claims can still fall within the scope of the disclosure.

Terms such as "first" and "second" mentioned in the specification or claims are only used to name different elements or to distinguish different embodiments or ranges, and are not used to limit the upper limit or lower limit of the number of elements, nor are the terms intended to limit the manufacturing sequence or arrangement sequence of elements. In addition, it should be understood that when an element/film layer is referred to as being disposed on (or over) another element/film layer, the element/film layer can be either directly disposed on (or over) the other element/film layer, and there is direct contact between the two elements/film layers; or the element/film layer is indirectly disposed on (or above) the other element/film layer, and there are one or more elements/film layers between the two elements/film layers.

Figure 2:
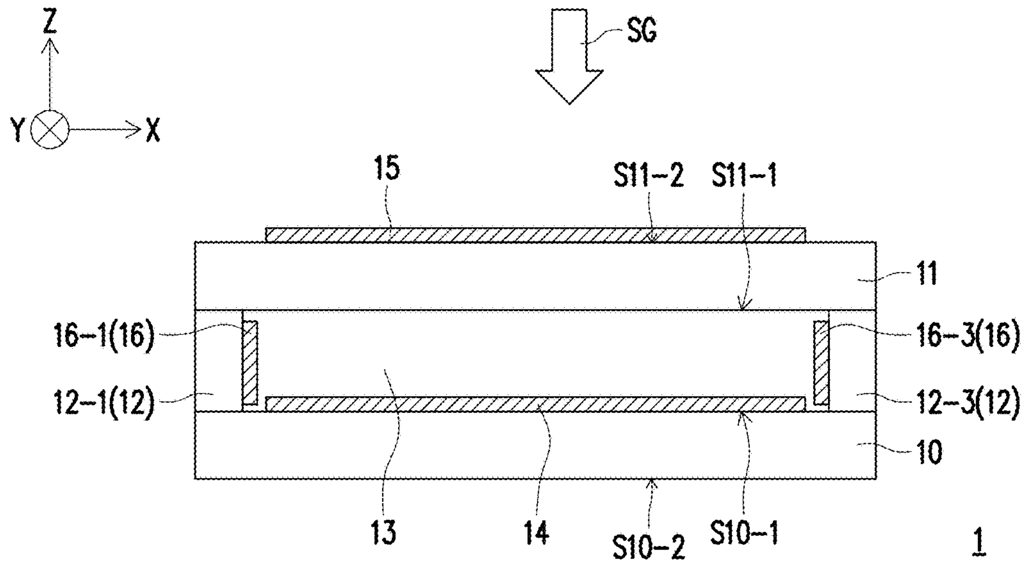
FIG. 2 is a schematic view of the antenna unit of FIG. 1 at a cross-section R1.
Figure 3:
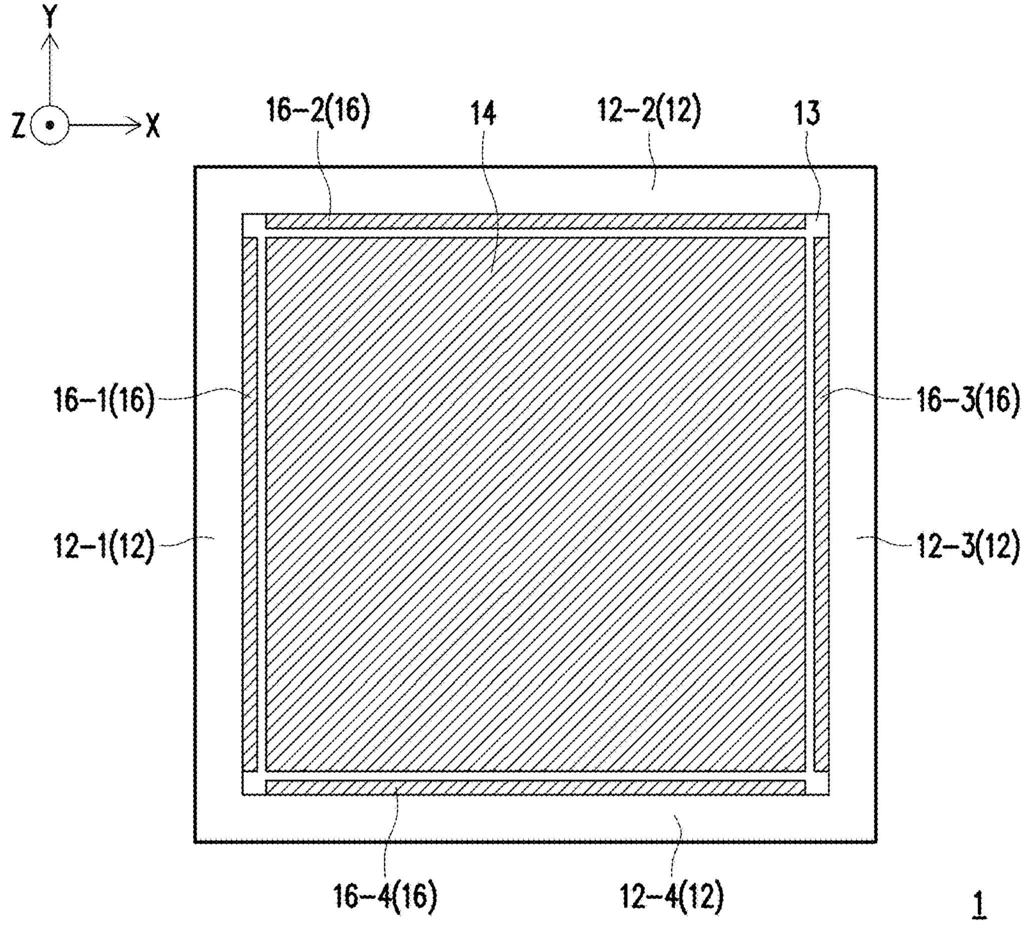
FIG. 3 is a schematic view of the antenna unit of FIG. 1 at a cross-section R2.
Figure 4:
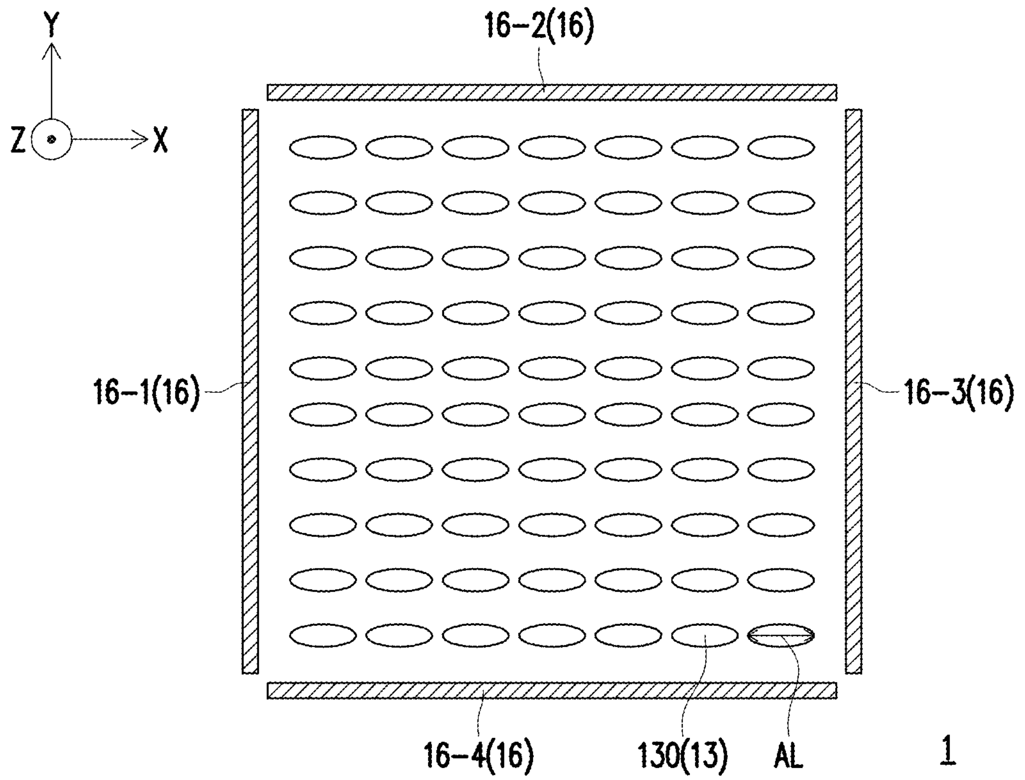
FIG. 4 is a schematic view of the antenna unit of FIG. 1 on an XY plane, which illustrates a state when an electric field parallel to a direction X is applied to a plurality of liquid crystal molecules.
Figure 5:
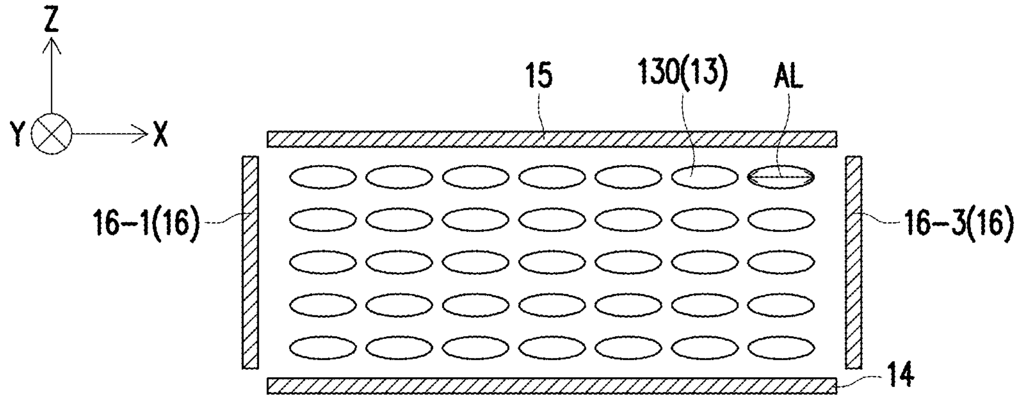
FIG. 5 to FIG. 7 are schematic views of the antenna unit of FIG. 1 on an XZ plane, which respectively illustrates a state when a vertical electric field (electric field parallel to a direction Z) increasing from 0 is applied to a plurality of liquid crystal molecules after the alignment step of FIG. 4.
Figure 6:
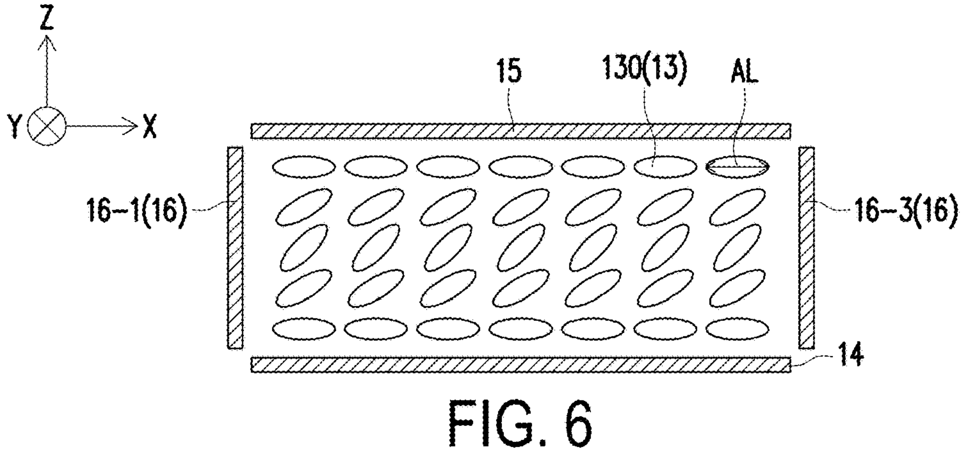
Figure 7:
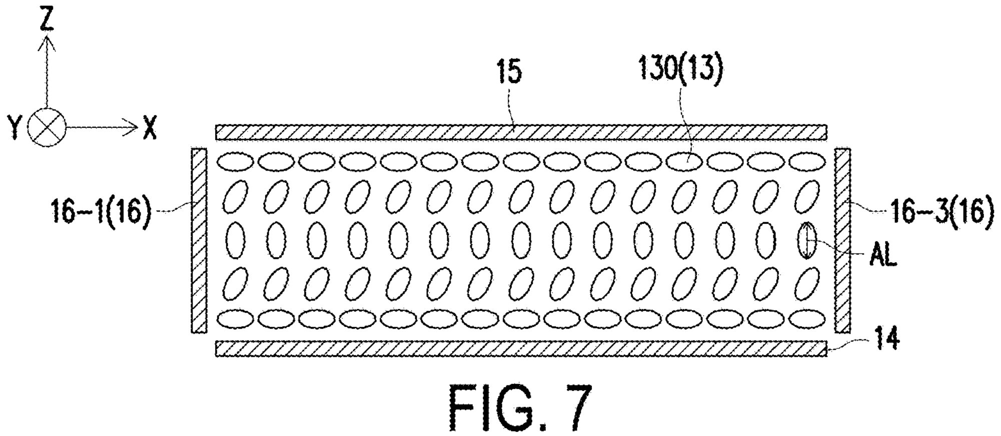
Figure 8:
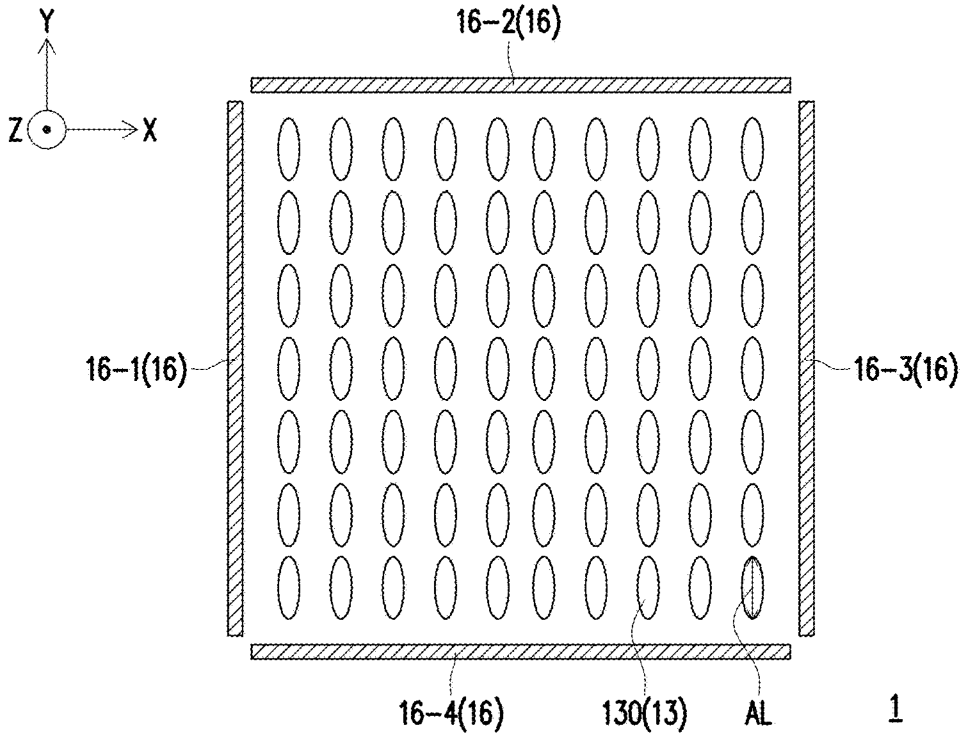
FIG. 8 is a schematic view of the antenna unit of FIG. 1 on an XY plane, which illustrates a state when an electric field parallel to a direction Y is applied to a plurality of liquid crystal molecules.
Figure 9:
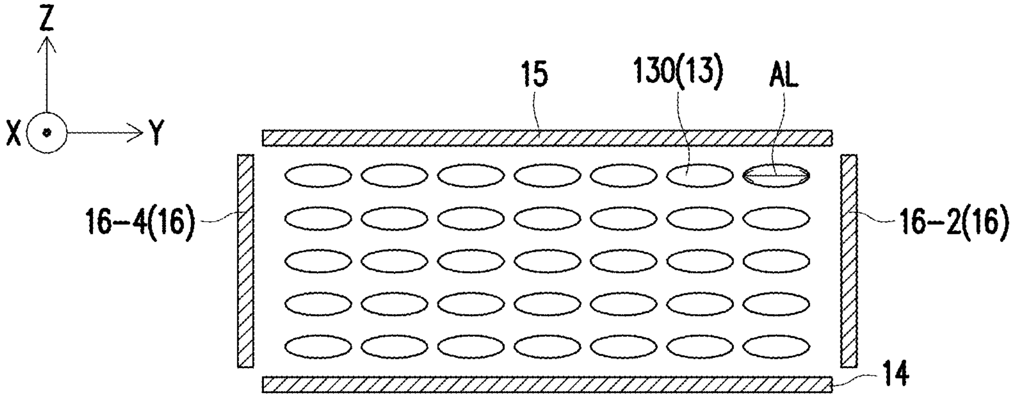
FIG. 9 to FIG. 11 are schematic views of the antenna unit of FIG. 1 on an XZ plane, which respectively illustrates a state when a vertical electric field (electric field parallel to a direction Z) increasing from 0 is applied to a plurality of liquid crystal molecules after the alignment step of FIG. 7.
Figure 10:
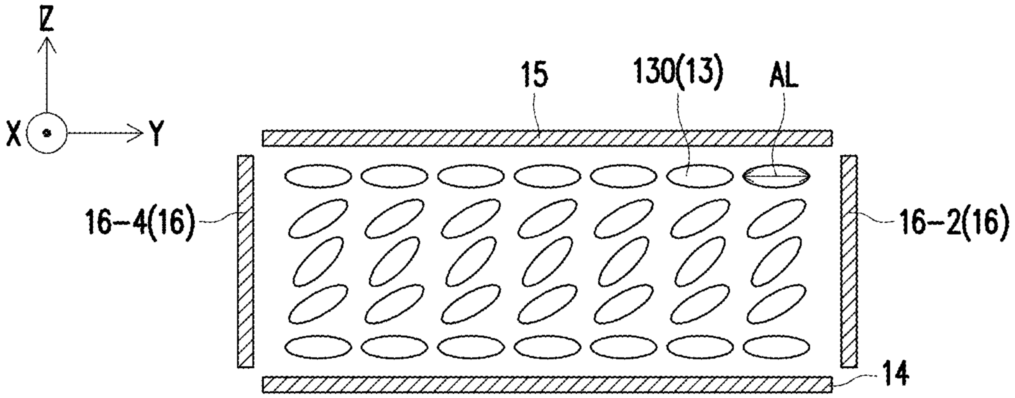
Figure 11:
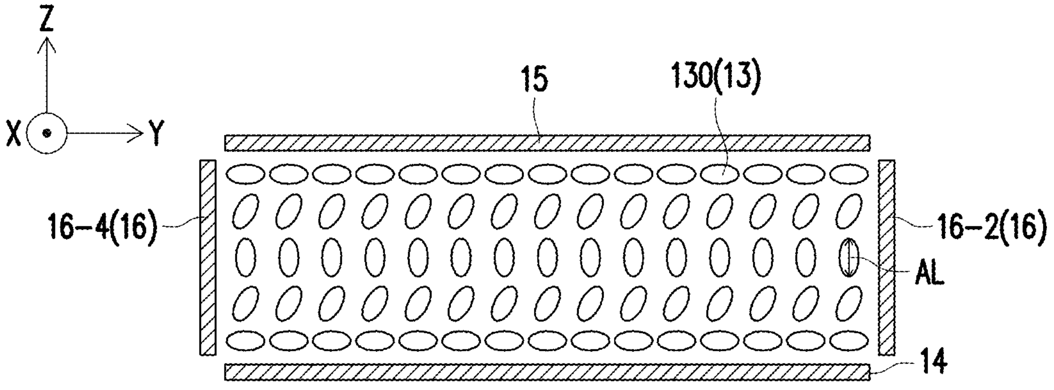
Figure 12:
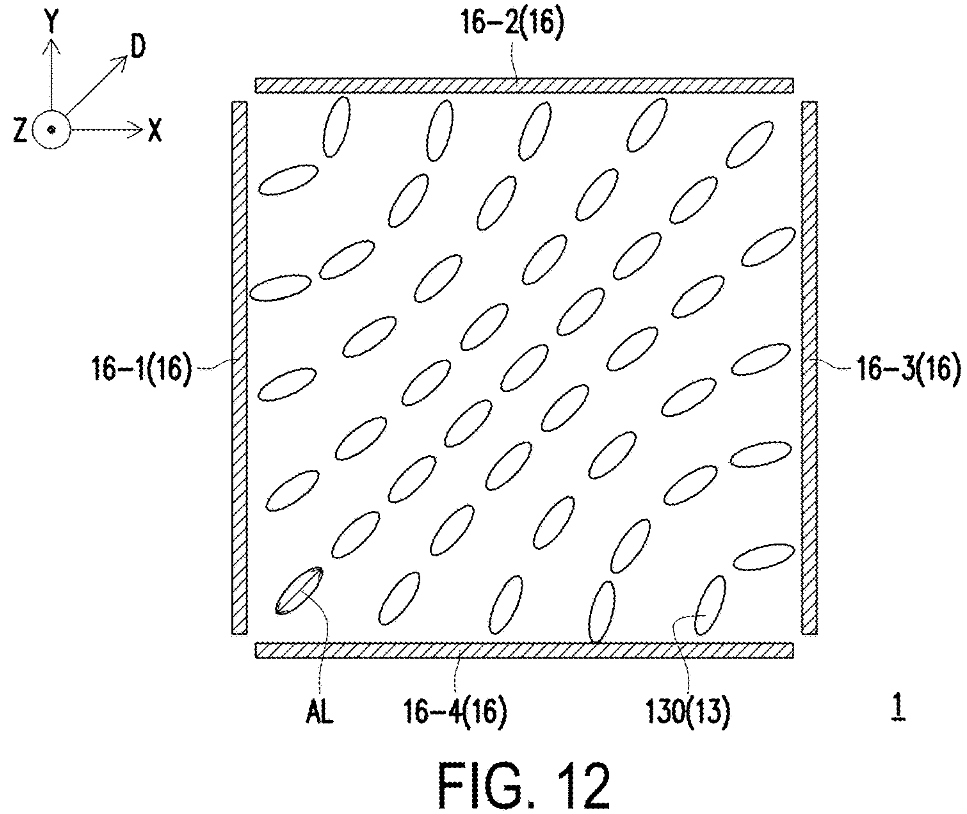
FIG. 12 is a schematic view of the antenna unit of FIG. 1 on an XY plane, which illustrates a state when an electric field parallel to a direction D is applied to a plurality of liquid crystal molecules.
Figure 13:
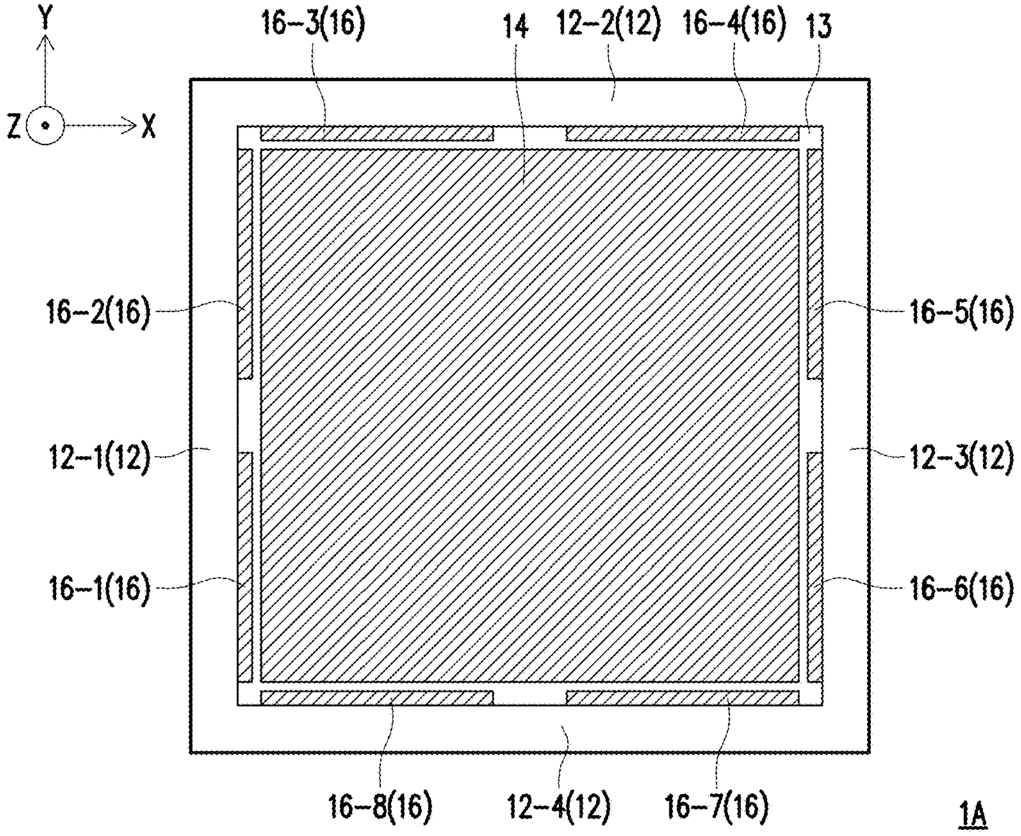
FIG. 13 is another schematic view of the antenna unit of FIG. 1 at a cross-section R2.
Figure 14:
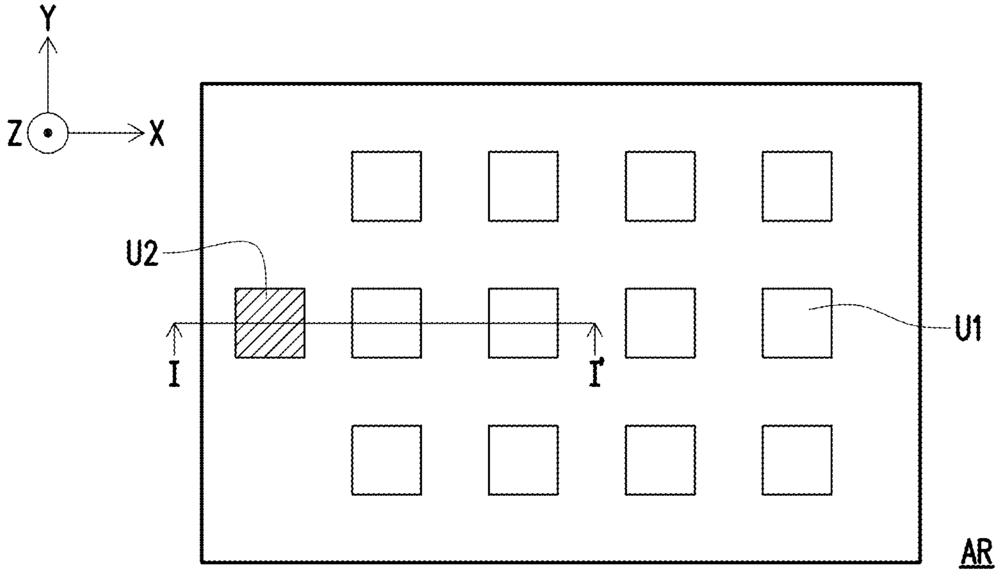
FIG. 14 is a schematic top view of an antenna array according to an embodiment of the disclosure.
Figure 17:
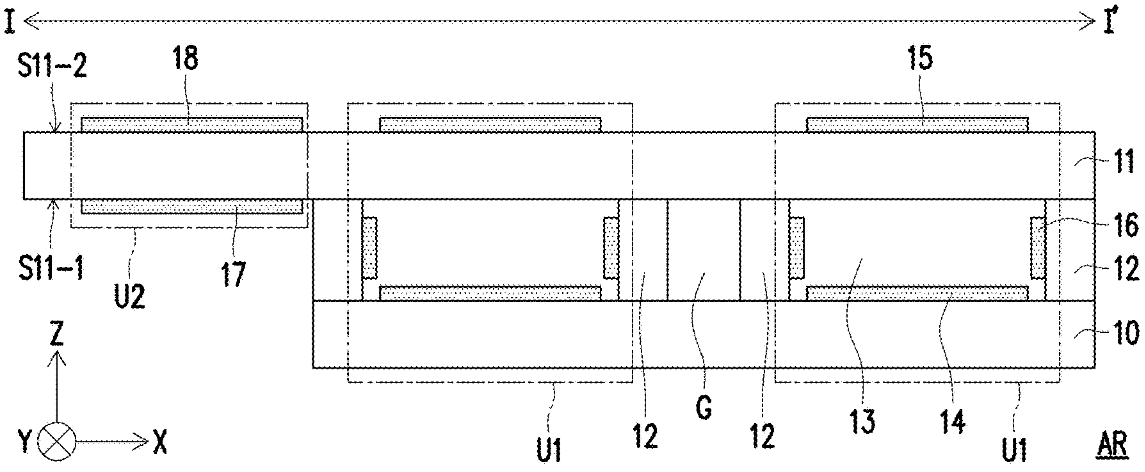
Figure 18:
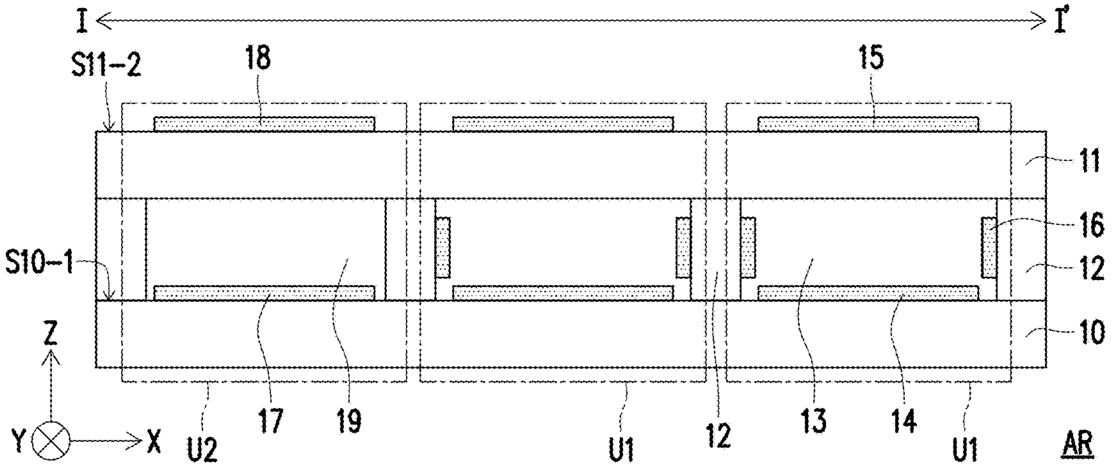
Figure 19:
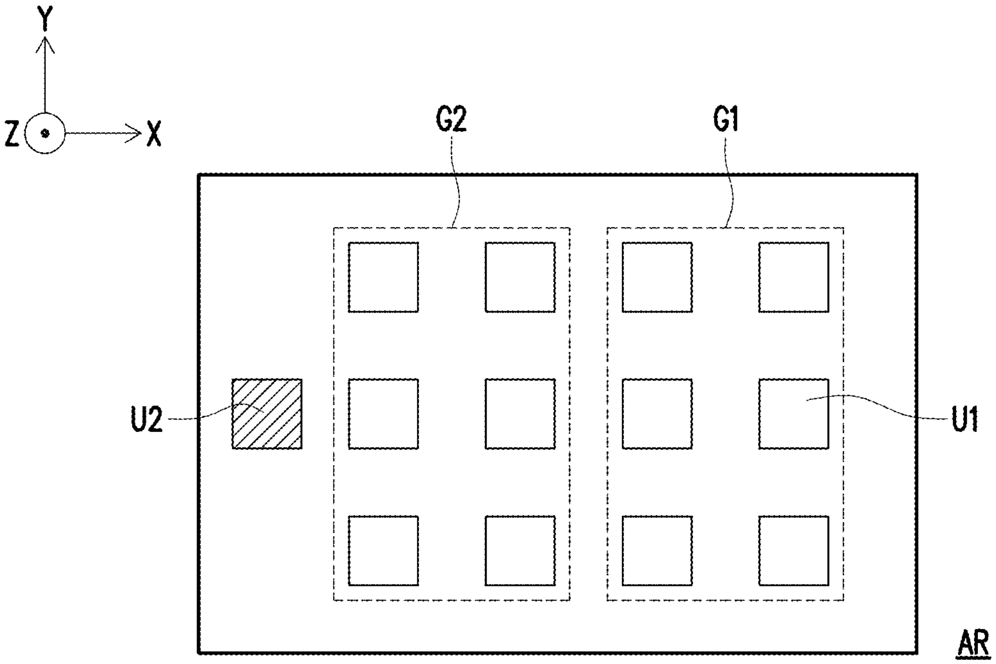
FIG. 19 and FIG. 20 are schematic top views of antenna arrays according to other embodiments of the disclosure.
Figure 20:
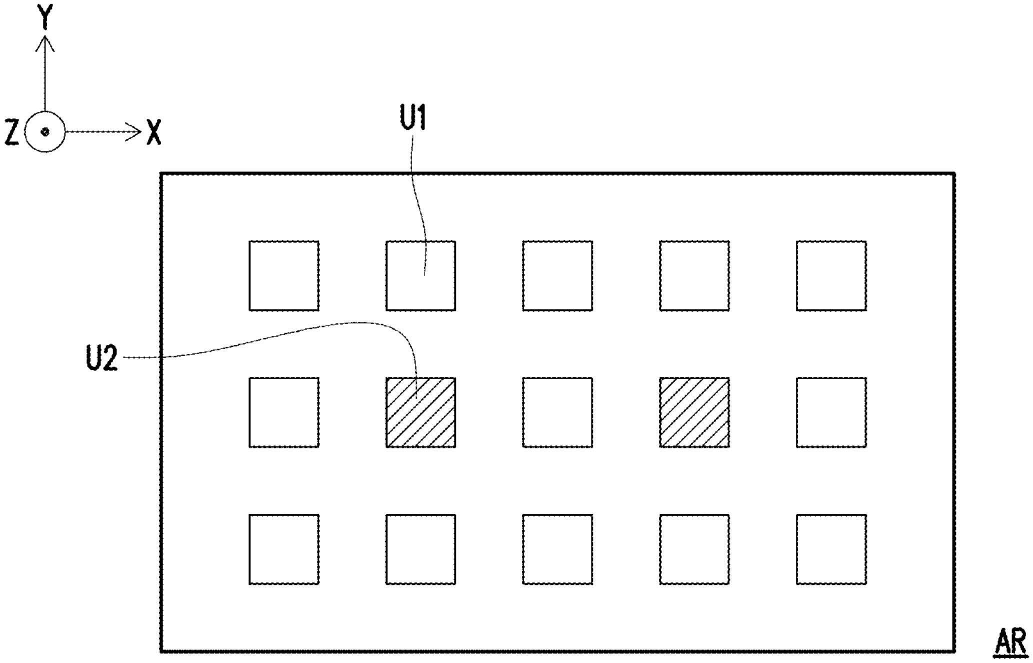

FIG. 1 is a schematic view of an antenna unit according to an embodiment of the disclosure. FIG. 2 is a schematic view of the antenna unit of FIG. 1 at a cross-section R1. FIG. 3 is a schematic view of the antenna unit of FIG. 1 at a cross-section R2. FIG. 4 is a schematic view of the antenna unit of FIG. 1 on an XY plane, which illustrates a state when an electric field parallel to a direction X is applied to a plurality of liquid crystal molecules. FIG. 5 to FIG. 7 are schematic views of the antenna unit of FIG. 1 on an XZ plane, which respectively illustrates a state when a vertical electric field (electric field parallel to a direction Z) increasing from 0 is applied to a plurality of liquid crystal molecules after the alignment step of FIG. 4. FIG. 8 is a schematic view of the antenna unit of FIG. 1 on an XY plane, which illustrates a state when an electric field parallel to a direction Y is applied to a plurality of liquid crystal molecules. FIG. 9 to FIG. 11 are schematic views of the antenna unit of FIG. 1 on an XZ plane, which respectively illustrates a state when a vertical electric field (electric field parallel to a direction Z) increasing from 0 is applied to a plurality of liquid crystal molecules after the alignment step of FIG. 7. FIG. 12 is a schematic view of the antenna unit of FIG. 1 on an XY plane, which illustrates a state when an electric field parallel to a direction D is applied to a plurality of liquid crystal molecules. FIG. 13 is another schematic view of the antenna unit of FIG. 1 at a cross-section R2. FIG. 14 is a schematic top view of an antenna array according to an embodiment of the disclosure. FIG. 15 to FIG. 18 are various cross-sectional schematic views of the section line I-I' in FIG. 14 respectively. FIG. 19 and FIG. 20 are schematic top views of antenna arrays according to other embodiments of the disclosure.

Please refer to FIG. 1 to FIG. 3 first. An antenna unit 1 (for example, it can also be referred to as a first antenna unit) can include a first substrate 10, a second substrate 11, a plurality of sidewalls 12, a liquid crystal layer 13, a first electrode 14, a second electrode 15, and a plurality of sidewall electrodes 16, but are not limited thereto. According to different requirements, the antenna unit 1 can further include other elements or film layers.

The first substrate 10 can be a rigid substrate or a flexible substrate. The material of the first substrate 10 includes, for example, glass, ceramics, or plastic, but is not limited thereto.

The second substrate 11 is opposite to the first substrate 10. As shown in FIG. 1, the second substrate 11 is disposed to overlap the first substrate 10 in a direction Z, for example. The second substrate 11 can be a rigid substrate or a flexible substrate. The material of the second substrate 11 includes, for example, glass, ceramics, or plastic, but is not limited thereto.

The plurality of sidewalls 12 are supported between the first substrate 10 and the second substrate 11, and the first substrate 10, the second substrate 11, and the plurality of sidewalls 12 enclose a space for accommodating the liquid crystal layer 13. Taking a hexahedral antenna unit as an example, the antenna unit 1 can include four sidewalls 12, such as a first sidewall 12-1, a second sidewall 12-2, a third sidewall 12-3, and a fourth sidewall 12-4. The sidewalls 12 are connected to each other in pairs to form a frame shape, as shown in FIG. 3. However, it should be understood that the number of sidewalls 12 in the antenna unit 1 can be changed according to actual requirements, and is not limited to four. The material of the plurality of sidewalls 12 includes, for example, a sealant material, but is not limited thereto. In some embodiments, the plurality of sidewalls 12 can be integrally formed.

The liquid crystal layer 13 is located between the first substrate 10, the second substrate 11, and the plurality of sidewalls 12. Although not shown in FIG. 1 to FIG. 3, the liquid crystal layer 13 can include a plurality of liquid crystal molecules, such as a plurality of positive liquid crystal molecules, but is not limited thereto. The liquid crystal molecule has a long axis and a short axis perpendicular to the long axis. When no external electric field is applied to the liquid crystal layer 13, the plurality of liquid crystal molecules, for example, exhibit a random tilting state without a specific tilting direction (no alignment layer is disposed). On the other hand, when an external electric field is applied to the liquid crystal layer 13, a plurality of liquid crystal molecules will tilt or turn toward the direction of the external electric field, so that the long axes of the liquid crystal molecules are parallel or substantially parallel to the direction of the external electric field.

The first electrode 14 is disposed on the first substrate 10. In some embodiments, as shown in FIG. 2, the first electrode 14 can be disposed on an inner surface S10-1 of the first substrate 10 (such as the surface of the first substrate 10 facing the second substrate 11), so that the first electrode 14 is located between the first substrate 10 and the liquid crystal layer 13, but not limited thereto. In other embodiments, although not shown, the first electrode 14 can be disposed on an outer surface S10-2 of the first substrate 10 (such as the surface of the first substrate 10 facing away from the second substrate 11), so that the first substrate 10 is located between the first electrode 14 and the liquid crystal layer 13. The material of the first electrode 14 includes, for example, metal, alloy, or a combination of the above, but is not limited thereto. In some embodiments, the first electrode 14 can be a ground electrode, and the first electrode 14 can be an entire surface electrode, but is not limited thereto.

The second electrode 15 is disposed on the second substrate 11 and electrically insulated from the first electrode 14. In some embodiments, as shown in FIG. 2, the second electrode 15 can be disposed on an outer surface S11-2 of the second substrate 11 (such as the surface of the second substrate 11 facing away from the first substrate 10), so that the second substrate 11 is located between the second electrode 15 and the liquid crystal layer 13, but is not limited thereto. In other embodiments, although not shown, the second electrode 15 can be disposed on an inner surface S11-1 of the second substrate 11 (such as the surface of the second substrate 11 facing the first substrate 10), so that the second electrode 15 is located between the second substrate 11 and the liquid crystal layer 13. The material of the second electrode 15 includes, for example, metal, alloy, or a combination of the above, but is not limited thereto. In some embodiments, the second electrode 15 can be a patterned electrode, and the top view shape of the second electrode 15 can include a rectangle, a circle, a ring, or a combination of the above, but is not limited thereto.

The second electrode 15 overlaps the first electrode 14 in the direction Z, and the second electrode 15 and the first electrode 14 are at least separated by the liquid crystal layer 13 to be electrically insulated from each other. By independently controlling the voltages applied to the first electrode 14 and the second electrode 15, a vertical electric field can be applied to the liquid crystal layer 13 (the direction of the electric field is parallel or substantially parallel to the direction Z), thereby changing the equivalent dielectric constant of the antenna unit 1. By changing the equivalent dielectric constant of the antenna unit 1, design parameters such as the phase delay and/or radiation intensity of a signal SG (such as an electromagnetic wave) can be modulated. For an antenna array including a plurality of antenna units, it is equivalent to modulating the transmission (reflection) direction and/or radiation intensity of the signal SG. The electromagnetic wave can be a radio frequency, a millimeter wave, a terahertz (THz) wave, or electromagnetic waves in other frequency ranges.

In the embodiment where the antenna unit 1 is used as the electromagnetic wave reflection unit, by disposing the second electrode 15 on the surface of the second substrate 11 facing the signal SG (such as the outer surface S11-2), it can help to shorten the transmission path of the signal or reduce the loss caused by the signal SG passing through the second substrate 11, thereby facilitating the signal transmission.

The plurality of sidewall electrodes 16 are electrically insulated from each other and are respectively disposed on the plurality of sidewalls 12. The plurality of sidewall electrodes 16 are electrically insulated from the first electrode 14 and the second electrode 15. In some embodiments, as shown in FIG. 3, the antenna unit 1 can include four sidewall electrodes 16, such as a first sidewall electrode 16-1 disposed on the first sidewall 12-1, a second sidewall electrode 16-2 disposed on the second sidewall 12-2, a third sidewall electrode 16-3 disposed on the third sidewall 12-3, and a fourth sidewall electrode 16-4 disposed on the fourth sidewall 12-4. However, it should be understood that the number of sidewall electrodes 16 in the antenna unit 1 can be changed according to actual requirements, and is not limited to four. According to different designs, the number of the plurality of sidewall electrodes 16 can be greater than or equal to the number of the plurality of sidewalls 12. For example, by increasing the number of sidewall electrodes 16 disposed on any sidewall 12, the adjustable range of the horizontal electric field direction (the electric field direction parallel to an XY plane) can be increased.

In detail, the plurality of sidewall electrodes 16 are electrically insulated from each other, so the voltage of each sidewall electrode 16 can be controlled independently. By independently controlling the voltage applied to each sidewall electrode 16, the direction of the horizontal electric field applied to the liquid crystal layer 13 can be modulated, thereby adjusting the alignment of the liquid crystal molecules in the liquid crystal layer 13.

Before modulating the electromagnetic wave (such as applying a vertical electric field), by applying a horizontal electric field to the liquid crystal layer 13, the alignment direction of the plurality of liquid crystal molecules in the liquid crystal layer 13 is parallel to the polarization direction of the signal SG (the polarization direction of the electric field of the electromagnetic wave), which can improve the problem of dual-permittivity (for example, the liquid crystal layer 13 provides a single dielectric constant to the electromagnetic wave), so that the design parameters such as the transmission direction or radiation intensity of the signal modulated by the antenna unit 1 fall within the preset range.

For example, another antenna unit (not shown, and is for example, referred to as a second antenna unit) can be used to sense the electromagnetic wave to confirm the polarization direction of the electromagnetic wave. If the polarization direction of the signal SG (refer to FIG. 2) incident on the antenna unit 1 is parallel to a direction X, a plurality of liquid crystal molecules 130 in the liquid crystal layer 13 can be aligned first, so that the long axes AL of the plurality of liquid crystal molecules 130 in the liquid crystal layer 13 (such as the positive liquid crystal molecules) is parallel or substantially parallel to the direction X, as shown in FIG. 4 and FIG. 5.

The above-mentioned step of aligning the plurality of liquid crystal molecules 130 (applying a horizontal electric field) can include applying a first voltage to the first sidewall electrode 16-1, and applying a second voltage different from the first voltage to the third sidewall electrode 16-3 to produce a horizontal electric field parallel to the direction X. In some embodiments, the step of aligning (applying a horizontal electric field) the plurality of liquid crystal molecules 130 can further include making the sidewall electrodes other than the first sidewall electrode 16-1 and the third sidewall electrode 16-3 (such as the second sidewall electrode 16-2 and the fourth sidewall electrode 16-4) float, or applying a third voltage between the first voltage and the second voltage to sidewall electrodes other than the first sidewall electrode 16-1 and the third sidewall electrode 16-3 (such as the second sidewall electrode 16-2 and the fourth sidewall electrode 16-4), so that the long axes AL of the plurality of liquid crystal molecules 130 in at least a central area of the antenna unit 1 (the main area for modulating electromagnetic waves, such as the area where the second electrode is located) are parallel or substantially parallel to the polarization direction (such as the direction X) of the signal.

After applying a horizontal electric field to the liquid crystal layer 13 so that the alignment direction of the liquid crystal molecule 130 is parallel to the polarization direction of the signal SG incident on the antenna unit 1 (refer to FIG. 2), a vertical electric field (electric field parallel to the direction Z) is applied to the liquid crystal layer 13 by the first electrode 14 and the second electrode 15 to change the equivalent dielectric constant of the antenna unit 1, so that design parameters such as the transmission direction and/or radiation intensity of the signal can be modulated. FIG. 5 illustrates a state of the liquid crystal layer 13 when a potential difference between the first electrode 14 and the second electrode 15 is 0, and FIG. 6 to FIG. 7 illustrate a state of the liquid crystal layer 13 when a potential difference between the first electrode 14 and the second electrode 15 is not 0. As shown in FIG. 5 to FIG. 7, when the vertical electric field (the potential difference between the first electrode 14 and the second electrode 15) applied to the liquid crystal layer 13 gradually increases from 0, the long axes AL of the plurality of liquid crystal molecules 130 change from a direction parallel to the direction X to a direction between the direction X and the direction Z. When the vertical electric field is large enough, the long axes AL of the plurality of liquid crystal molecules 130 can even be parallel to the direction Z.

The above step of applying a vertical electric field can include applying a fourth voltage to the first electrode 14 and applying a fifth voltage that is the same as or different from the fourth voltage to the second electrode 15. When the fourth voltage is the same as the fifth voltage, the potential difference between the first electrode 14 and the second electrode 15 is 0. At this time, the liquid crystal layer 13 is in the state shown in FIG. 5, for example. When the fourth voltage is different from the fifth voltage, the potential difference between the first electrode 14 and the second electrode 15 is not 0. At this time, the liquid crystal layer 13 is in the state shown in FIG. 6, for example. In some embodiments, when the fourth voltage is applied to the first electrode 14 and the fifth voltage is applied to the second electrode 15, the plurality of sidewall electrodes 16 (including the first sidewall electrode 16-1, the second sidewall electrode 16-2, the third sidewall electrode 16-3, and the fourth sidewall electrode 16-4) can be made to float. Under this structure, after the plurality of sidewall electrodes 16 are made to float for a period of time, a horizontal electric field can be applied to the liquid crystal layer 13 again to readjust the alignment of the plurality of liquid crystal molecules 130, so that the alignment direction of the liquid crystal molecules 130 can be continuously parallel to the set polarization direction, for example but not limited to, the polarization direction of the signal SG (refer to FIG. 2) incident on the antenna unit 1.

Alternatively, in some other embodiments, when the fourth voltage is applied to the first electrode 14 and the fifth voltage is applied to the second electrode 15, the fourth voltage can be applied to the first sidewall electrode 16-1 and the fifth voltage can be applied to the third sidewall electrode 16-3 to maintain the alignment direction of the liquid crystal molecules 130 or reduce the number or frequency of re-alignment. In some embodiments, the voltage difference between the first voltage and the second voltage for alignment (for example, the absolute value taken after subtracting the second voltage from the first voltage) can be greater than the voltage difference between the fourth voltage and the fifth voltage for maintaining alignment (for example, the absolute value taken after subtracting the fifth voltage from the fourth voltage) to shorten the alignment time or improve the alignment consistency, but is not limited thereto.

In addition, if the polarization direction of the signal SG (refer to FIG. 2) incident on the antenna unit 1 is parallel to a direction Y, the plurality of liquid crystal molecules 130 in the liquid crystal layer 13 can be aligned first, so that the long axes AL of the plurality of liquid crystal molecules 130 in the liquid crystal layer 13 (such as the positive liquid crystal molecules) is parallel or substantially parallel to the direction Y, as shown in FIG. 8 and FIG. 9.

The above-mentioned step of aligning the plurality of liquid crystal molecules 130 (applying a horizontal electric field) can include applying the first voltage to the second sidewall electrode 16-2 and applying the second voltage to the fourth sidewall electrode 16-4 to generate a horizontal electric field parallel to the direction Y. In some embodiments, the step of aligning the plurality of liquid crystal molecules 130 (applying a horizontal electric field) can further include making the sidewall electrodes other than the second sidewall electrode 16-2 and the fourth sidewall electrode 16-4 (such as the first sidewall electrode 16-1 and the third sidewall electrode 16-3) float, or applying the third voltage between the first voltage and the second voltage to the sidewall electrodes other than the second sidewall electrode 16-2 and the fourth sidewall electrode 16-4 (such as the first sidewall electrode 16-1 and the third sidewall electrode 16-3), so that The electrode 16-1 and the third sidewall electrode 16-3) apply a third voltage between the first voltage and the second voltage, so that the long axes AL of the plurality of liquid crystal molecules 130 in at least a central area of the antenna unit 1 (the main area for modulating electromagnetic waves, such as the area where the second electrode is located) are parallel or substantially parallel to the polarization direction (such as the direction Y) of the signal.

After applying a horizontal electric field to the liquid crystal layer 13 so that the alignment direction of the liquid crystal molecule 130 is parallel to the polarization direction of the signal SG incident on the antenna unit 1 (refer to FIG. 2), a vertical electric field (electric field parallel to the direction Z) is applied to the liquid crystal layer 13 by the first electrode 14 and the second electrode 15 to change the equivalent dielectric constant of the antenna unit 1, so that design parameters such as the transmission direction and/or radiation intensity of the signal can be modulated. FIG. 9 illustrates a state of the liquid crystal layer 13 when a potential difference between the first electrode 14 and the second electrode 15 is 0, and FIG. 10 and FIG. 11 illustrate a state of the liquid crystal layer 13 when a potential difference between the first electrode 14 and the second electrode 15 is not 0. As shown in FIG. 9 to FIG. 11, when the vertical electric field (the potential difference between the first electrode 14 and the second electrode 15) applied to the liquid crystal layer 13 gradually increases from 0, the long axes AL of the plurality of liquid crystal molecules 130 change from a direction parallel to the direction Y to a direction between the direction Y and the direction Z. When the vertical electric field is large enough, the long axes AL of the plurality of liquid crystal molecules 130 can even be parallel to the direction Z.

The above step of applying a vertical electric field can include applying the fourth voltage to the first electrode 14 and applying the fifth voltage to the second electrode 15. When the fourth voltage is the same as the fifth voltage, the potential difference between the first electrode 14 and the second electrode 15 is 0. At this time, the liquid crystal layer 13 is in the state shown in FIG. 8, for example. When the fourth voltage is different from the fifth voltage, the potential difference between the first electrode 14 and the second electrode 15 is not 0. At this time, the liquid crystal layer 13 is in the state shown in FIG. 9, for example. In some embodiments, when the fourth voltage is applied to the first electrode 14 and the fifth voltage is applied to the second electrode 15, the plurality of sidewall electrodes 16 (including the first sidewall electrode 16-1, the second sidewall electrode 16-2, the third sidewall electrode 16-3, and the fourth sidewall electrode 16-4) can be made to float. Under this structure, after the plurality of sidewall electrodes 16 are made to float for a period of time, a horizontal electric field can be applied to the liquid crystal layer 13 again to readjust the alignment of the plurality of liquid crystal molecules

130, so that the alignment direction of the liquid crystal molecules 130 can be continuously parallel to the set polarization direction, for example but not limited to, the polarization direction of the signal SG (refer to FIG. 2) incident on the antenna unit 1.

Alternatively, in other embodiments, when the fourth voltage is applied to the first electrode 14 and the fifth voltage is applied to the second electrode 15, the fourth voltage can be applied to the second sidewall electrode 16-2 and the fifth voltage can be applied to the fourth sidewall electrode 16-4 to maintain the alignment direction of the liquid crystal molecules 130 or reduce the number or frequency of re-alignment. In some embodiments, the voltage difference between the first voltage and the second voltage for alignment (for example, the absolute value taken after subtracting the second voltage from the first voltage) can be greater than the voltage difference between the fourth voltage and the fifth voltage for maintaining alignment (for example, the absolute value taken after subtracting the fifth voltage from the fourth voltage) to shorten the alignment time or improve the alignment consistency, but is not limited thereto.

Furthermore, if the polarization direction of the signal SG (refer to FIG. 2) incident on the antenna unit 1 is parallel to a direction D, and the direction D is not parallel and not perpendicular to the direction X and the direction Y, the plurality of liquid crystal molecules 130 in the liquid crystal layer 13 can be aligned first, so that the long axes AL of the plurality of liquid crystal molecules 130 in the central area of the liquid crystal layer 13 (such as the positive liquid crystal molecules) is parallel or substantially parallel to the direction D, as shown in FIG. 12.

The above-mentioned step of aligning the plurality of liquid crystal molecules 130 (applying a horizontal electric field) can include applying the first voltage to the first sidewall electrode 16-1 and the second sidewall electrode 16-2, and applying the second voltage to the third sidewall electrode 16-3 and the fourth sidewall electrode 16-4 to generate a horizontal electric field substantially parallel to the direction D in the central area of the liquid crystal layer 13.

As mentioned above, after applying a horizontal electric field to the liquid crystal layer 13 so that the alignment direction of the liquid crystal molecule 130 is parallel to the polarization direction of the signal SG incident on the antenna unit 1 (refer to FIG. 2), a vertical electric field (electric field parallel to the direction Z) is applied to the liquid crystal layer 13 by the first electrode 14 and the second electrode 15 to change the equivalent dielectric constant of the antenna unit 1, so that design parameters such as the transmission direction and/or radiation intensity of the signal can be modulated.

The above step of applying a vertical electric field can include applying the fourth voltage to the first electrode 14 and applying the fifth voltage to the second electrode 15. In some embodiments, when the fourth voltage is applied to the first electrode 14 and the fifth voltage is applied to the second electrode 15, the plurality of sidewall electrodes 16 (including the first sidewall electrode 16-1, the second sidewall electrode 16-2, and the third sidewall electrode 16-3, the fourth sidewall electrode 16-4) can be made to float. Under this structure, after the plurality of sidewall electrodes 16 are made to float for a period of time, a horizontal electric field can be applied to the liquid crystal layer 13 again to readjust the alignment of the plurality of liquid crystal molecules 130, so that the alignment direction of the liquid crystal molecules 130 can be continuously parallel to the set polarization direction, for example but not limited to, the polarization direction of the signal SG (refer to FIG. 2) incident on the antenna unit 1.

Alternatively, in other embodiments, when the fourth voltage is applied to the first electrode 14 and the fifth voltage is applied to the second electrode 15, the fourth voltage can be applied to the first sidewall electrode 16-1 and the second sidewall electrode 16-2 and the fifth voltage can be applied to the third sidewall electrode 16-3 and the fourth sidewall electrode 16-4 to maintain the alignment direction of the liquid crystal molecules 130 or reduce the number or frequency of re-alignment. In some embodiments, the voltage difference between the first voltage and the second voltage for alignment (for example, the absolute value taken after subtracting the second voltage from the first voltage) can be greater than the voltage difference between the fourth voltage and the fifth voltage for maintaining alignment (for example, the absolute value taken after subtracting the fifth voltage from the fourth voltage) to shorten the alignment time or improve the alignment consistency, but is not limited thereto.

Although the above-mentioned embodiment is exemplified by disposing a sidewall electrode 16 on each sidewall 12, the disclosure is not limited thereto. As shown in FIG. 13, in an antenna unit 1A, the plurality of sidewall electrodes 16 can be disposed on each sidewall 12. For example, the first sidewall electrode 16-1 and the second sidewall electrode 16-2 can be disposed on the first sidewall 12-1, the third sidewall electrode 16-3 and the fourth sidewall electrode 16-4 can be disposed on the second sidewall 12-2, a fifth sidewall electrode 16-5 and a sixth sidewall electrode 16-6 can be disposed on the third sidewall 12-3, and a seventh sidewall electrode 16-7 and an eighth sidewall electrode 16-8 can be disposed on the fourth sidewall 12-4, but not limited thereto. By increasing the number of sidewall electrodes 16, the adjustable range of the horizontal electric field direction (the electric field direction parallel to the XY plane) can be increased. That is, the adjustable range/angle of the alignment direction of the liquid crystal layer 13 can be increased. For example, in some embodiments, the first voltage, the second voltage, the third voltage, the fourth voltage, the fifth voltage, and a sixth voltage can be respectively applied to the eighth sidewall electrode 16-8, the fourth sidewall electrode 16-4, the first sidewall electrode 16-1, the third sidewall electrode 16-3, the seventh sidewall electrode 16-7, and the fifth sidewall electrode 16-5, and the second sidewall electrode 16-2 and the sixth sidewall electrode 16-6 can be made to float. The voltage difference between the first voltage and the second voltage (for example, subtracting the first voltage from the second voltage) is greater than the voltage difference between the third voltage and the fourth voltage (for example, subtracting the third voltage from the fourth voltage), and the voltage difference between the third voltage and the fourth voltage is equal to the voltage difference between the fifth voltage and the sixth voltage (for example, subtracting the fifth voltage from the sixth voltage), but is not limited thereto. In other embodiments, the first voltage can be applied to the first sidewall electrode 16-1 and the eighth sidewall electrode 16-8, the second voltage can be applied to the fourth sidewall electrode 16-4 and the fifth sidewall electrode 16-5, the third voltage can be applied to the third sidewall electrode 16-3 and the sixth sidewall electrode 16-6, and the fourth voltage can be applied to the second sidewall electrode 16-2 and the seventh sidewall electrode 16-7. The second voltage is greater than the third voltage, the third voltage is greater than the fourth voltage, and the fourth voltage is greater than the first voltage.

Figure 15:
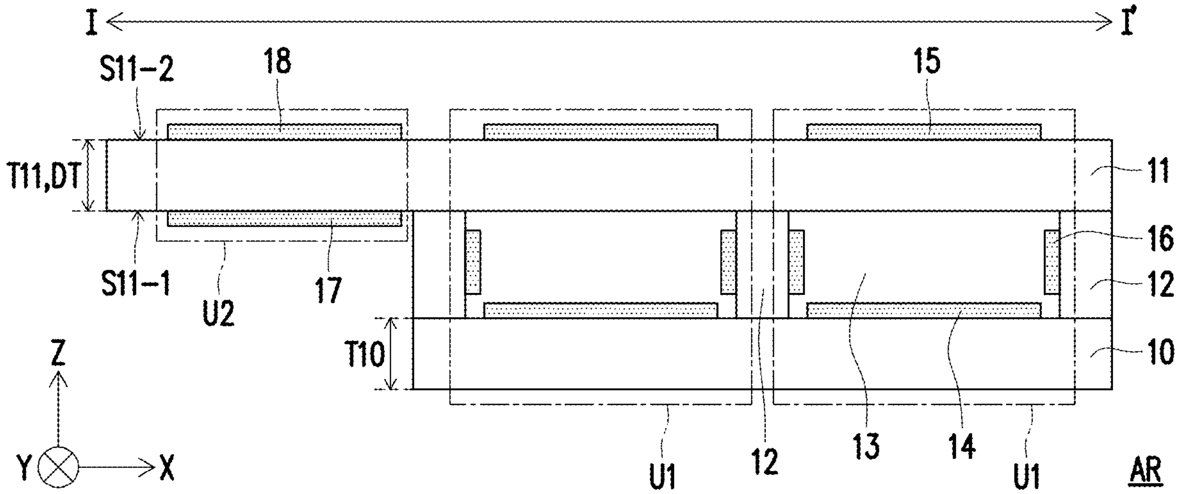
FIG. 15 to FIG. 18 are various cross-sectional schematic views of the section line I-I' in FIG. 14 respectively.

Referring to FIG. 14 and FIG. 15, an antenna array AR can include a plurality of first antenna units U1 and at least one second antenna unit U2, but is not limited thereto. According to different requirements, the antenna array AR can further include other elements or film layers.

The first antenna unit U1 is used, for example, to modulate design parameters such as the transmission direction and/or radiation intensity of the signal (such as the electromagnetic wave). Each of the plurality of first antenna units U1 can adopt the structure of the above-mentioned antenna unit 1 or antenna unit 1A, and will not be repeated here.

The at least one second antenna unit U2 is disposed adjacent to the plurality of first antenna units U1. FIG. 12 schematically illustrates a second antenna unit U2, and the second antenna unit U2 is disposed on a side of the plurality of first antenna units U1. However, it should be understood that there can be a plurality of second antenna units U2 in the antenna array AR, and the actual structure of the plurality of second antenna units U2 and the relative disposition relationship between the plurality of second antenna units U2 and the plurality of first antenna units U1 can be changed according to the actual requirements.

The second antenna unit U2 is, for example, used to sense the electromagnetic wave transmitted to the antenna array AR to confirm the polarization direction of the electromagnetic wave, and can control the alignment direction of the liquid crystal layer 13 in each first antenna unit U1 according to requirements (such as shielding the electromagnetic wave or reflecting the electromagnetic wave).

The composition of the second antenna unit U2 can be different from the composition of the first antenna unit U1. As shown in FIG. 15, the second antenna unit U2 can include a third electrode 17 and a fourth electrode 18, and the third electrode 17 and the fourth electrode 18 can be disposed on at least one of the first substrate 10 and the second substrate 11. FIG. 15 schematically illustrates the third electrode 17 and the fourth electrode 18 being respectively disposed on the inner surface S11-1 and the outer surface S11-2 of the second substrate 11. That is, a distance DT between the third electrode 17 and the fourth electrode 18 can be equal to a thickness T11 of the second substrate 11. However, it should be understood that the third electrode 17 and the fourth electrode 18 can also be respectively disposed on the outer surface S10-2 and the inner surface S10-1 of the first substrate 10. That is, the distance DT between the third electrode 17 and the fourth electrode 18 can be equal to a thickness T10 of the first substrate 10. Alternatively, the third electrode 17 and the fourth electrode 18 can also be respectively disposed on the first substrate 10 and the second substrate 11.

Figure 16:
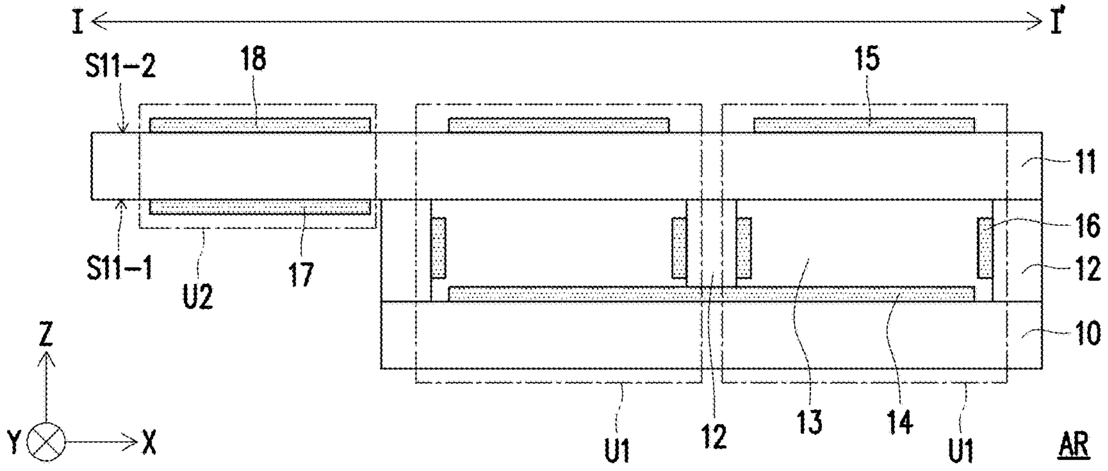

In FIG. 15, a plurality of first electrodes 14 in the plurality of first antenna units U1 are separated from each other, but the disclosure is not limited thereto. As shown in FIG. 16, the plurality of first electrodes 14 in the plurality of first antenna units U1 can be connected together.

In FIG. 15 and FIG. 16, two adjacent first antenna units U1 share the sidewall 12, for example, but the disclosure is not limited thereto. As shown in FIG. 17, the two adjacent first antenna units U1 may not share the sidewall 12. For example, two adjacent sidewalls 12 of the two adjacent first antenna units U1 can be separated from each other, and a gap G between the two adjacent sidewalls 12 can be filled with the liquid crystal layer 13 or not filled with any material.

In FIG. 15 to FIG. 17, the third electrode 17 and the fourth electrode 18 are respectively disposed on the inner surface S11-1 and the outer surface S11-2 of the second substrate 11, but the disclosure is not limited thereto. As shown in FIG. 18, the third electrode 17 and the fourth electrode 18 can be respectively disposed on the first substrate 10 and the second substrate 11. For example, the third electrode 17 can be disposed on the inner surface S10-1 of the first substrate 10, and the fourth electrode 18 can be disposed on the outer surface S11-2 of the second substrate 11. Under this structure, the second antenna unit U2 can further include a solid dielectric layer 19 disposed between the first substrate 10 and the second substrate 11. Based on appearance considerations, the dielectric constant of the solid dielectric layer 19 can be similar to the dielectric constant of the liquid crystal layer 13. In addition, the material of the solid dielectric layer 19 can be selected from glass fiber cloth (such as FR4), high-frequency PCB materials for antennas (such as Rogers), low-temperature co-fired ceramics (LTCC), or other similar and suitable high-frequency signal dielectric materials.

In some embodiments, as shown in FIG. 19, the plurality of first antenna units U1 can be divided into a plurality of groups, and different groups of antenna units can be respectively used to transmit and receive signals with different polarization directions. For example, the plurality of first antenna units U1 can be divided into a first group of antenna units G1 and a second group of antenna units G2. The first group of antenna units G1 is used to transmit and receive signals in the first polarization direction, and the second group of antenna units G2 is used to transmit and receive signals in the second polarization direction.

In some embodiments, as shown in FIG. 20, the antenna array AR can include the plurality of second antenna units U2, and the plurality of second antenna units U2 can be distributed among the plurality of first antenna units U1.

To sum up, in the embodiment of the disclosure, through the disposition of the plurality of sidewall electrodes, the alignment of the liquid crystal layer can be adjusted according to the polarization direction of the signal, which can help to improve the problem of dual-permittivity.

Although the present disclosure has been described with reference to the embodiments above, the embodiments are not intended to limit the present disclosure. Any person skilled in the art can make some changes and modifications without departing from the spirit and scope of the present disclosure. Therefore, the scope of the present disclosure will be defined in the appended claims.

What is claimed is:

1. An antenna unit, comprising:
- a first substrate;
- a second substrate, opposite to the first substrate;
- a plurality of sidewalls, supported between the first substrate and the second substrate;
- a liquid crystal layer, located between the first substrate, the second substrate, and the plurality of sidewalls;
- a first electrode, disposed on the first substrate;
- a second electrode, disposed on the second substrate, and electrically insulated from the first electrode; and
- a plurality of sidewall electrodes, electrically insulated from each other, and respectively disposed on the plurality of sidewalls, wherein the plurality of sidewall electrodes are electrically insulated from the first electrode and the second electrode, wherein the second substrate is located between the second electrode and the liquid crystal layer.

2. The antenna unit according to claim 1, wherein a number of the plurality of sidewall electrodes is greater than or equal to a number of the plurality of sidewalls.

3. An antenna array, comprising:

a first substrate;

a second substrate, opposite to the first substrate; and a plurality of first antenna units, wherein each of the plurality of first antenna units comprises:

a plurality of sidewalls, supported between the first substrate and the second substrate;

a liquid crystal layer, located between the first substrate, the second substrate, and the plurality of sidewalls;

a first electrode, disposed on the first substrate;

a second electrode, disposed on the second substrate, and electrically insulated from the first electrode; and a plurality of sidewall electrodes, electrically insulated from each other, and respectively disposed on the plurality of sidewalls, wherein the plurality of sidewall electrodes are electrically insulated from the first electrode and the second electrode; and at least one second antenna unit, disposed adjacent to the plurality of first antenna units, wherein the at least one second antenna unit comprises a third electrode and a fourth electrode, and the third electrode and the fourth electrode are disposed on at least one of the first substrate and the second substrate, wherein the second substrate is located between the second electrode and the liquid crystal layer.

4. The antenna array according to claim 3, wherein a number of the plurality of sidewall electrodes is greater than or equal to a number of the plurality of sidewalls.

5. The antenna array according to claim 3, wherein a distance between the third electrode and the fourth electrode is equal to a thickness of the first substrate or a thickness of the second substrate.

6. The antenna array according to claim 3, wherein the third electrode and the fourth electrode are respectively disposed on the first substrate and the second substrate, and the at least one second antenna unit further comprises a solid dielectric layer disposed between the first substrate and the second substrate.

7. An operating method of an antenna array, comprising:

providing the antenna array, wherein the antenna array comprises a first substrate, a second substrate opposite to the first substrate and a plurality of first antenna units, and each of the plurality of first antenna units comprises:

a plurality of sidewalls, supported between the first substrate and the second substrate;

a liquid crystal layer, located between the first substrate, the second substrate, and the plurality of sidewalls;

a first electrode, disposed on the first substrate;

a second electrode, disposed on the second substrate, and electrically insulated from the first electrode; and a plurality of sidewall electrodes, electrically insulated from each other, and respectively disposed on the plurality of sidewalls, wherein the plurality of sidewall electrodes are electrically insulated from the first electrode and the second electrode, wherein the second substrate is located between the second electrode and the liquid crystal layer;

applying a horizontal electric field to the liquid crystal layer of each of the plurality of first antenna units by the plurality of sidewall electrodes of the respective first antenna unit; and applying a vertical electric field to the liquid crystal layer of each of the plurality of first antenna units by the first electrode and the second electrode of the respective first antenna unit.

8. The operating method of the antenna array according to claim 7, wherein the horizontal electric field is applied before the vertical electric field is applied.

9. The operating method of the antenna array according to claim 7, wherein applying the horizontal electric field comprises:

applying a first voltage to at least one sidewall electrode of the plurality of sidewall electrodes, and applying a second voltage different from the first voltage to at least another sidewall electrode of the plurality of sidewall electrodes.

10. The operating method of the antenna array according to claim 9, wherein applying the horizontal electric field further comprises:

making the sidewall electrodes other than the at least one sidewall electrode and the at least another sidewall electrode float, or applying a third voltage between the first voltage and the second voltage to the sidewall electrodes other than the at least one sidewall electrode and the at least another sidewall electrode.

11. The operating method of the antenna array according to claim 9, wherein applying the vertical electric field comprises:

applying a fourth voltage to the first electrode, and applying a fifth voltage different from the fourth voltage to the second electrode.

12. The operating method of the antenna array according to claim 11, further comprising:

making the plurality of sidewall electrodes float, in response to applying the fourth voltage to the first electrode and applying the fifth voltage to the second electrode.

13. The operating method of the antenna array according to claim 12, further comprising:

applying the horizontal electric field to the liquid crystal layer again to readjust an alignment of a plurality of liquid crystal molecules, after making the plurality of sidewall electrodes float for a period of time.

14. The operating method of the antenna array according to claim 11, further comprising:

applying the fourth voltage to the at least one sidewall electrode and applying the fifth voltage to the at least another sidewall electrode, in response to applying the fourth voltage to the first electrode and applying the fifth voltage to the second electrode.

15. The operating method of the antenna array according to claim 14, wherein a voltage difference between the first voltage and the second voltage is greater than a voltage difference between the fourth voltage and the fifth voltage.

16. The operating method of the antenna array according to claim 9, wherein the antenna array further comprises at least one second antenna unit, and the operating method of the antenna array further comprises:

using the at least one second antenna unit to sense an electromagnetic wave transmitted to the antenna array to confirm a polarization direction of the electromagnetic wave.

* * * * *